(12) United States Patent
McIntyre, Jr. et al.

(10) Patent No.: US 7,469,223 B2
(45) Date of Patent: Dec. 23, 2008

(54) INDEX SELECTION METHOD

(75) Inventors: John Patrick McIntyre, Jr., Jamestown, RI (US); Leon L. Yang, Madison, NJ (US)

(73) Assignee: Morgan Stanley, New York, NY (US)

( * ) Notice: Subject to any disclaimer, the term of this patent is extended or adjusted under 35 U.S.C. 154(b) by 1137 days.

(21) Appl. No.: 09/819,304

(22) Filed: Mar. 28, 2001

(65) Prior Publication Data

US 2002/0184126 A1 Dec. 5, 2002

(51) Int. Cl.
*G06Q 40/00* (2006.01)

(52) U.S. Cl. .................................. 705/35; 705/36 R

(58) Field of Classification Search ................... None
See application file for complete search history.

(56) References Cited

U.S. PATENT DOCUMENTS

| | | | | | |
|---|---|---|---|---|---|
| 5,774,880 | A | | 6/1998 | Ginsberg | 705/36 |
| 5,819,237 | A | * | 10/1998 | Garman | 705/36 R |
| 5,819,238 | A | * | 10/1998 | Fernholz | 705/36 R |
| 5,857,176 | A | | 1/1999 | Ginsberg | 705/36 |
| 6,003,018 | A | * | 12/1999 | Michaud et al. | 705/36 R |
| 6,275,814 | B1 | * | 8/2001 | Giansante et al. | 705/36 R |
| 6,336,103 | B1 | * | 1/2002 | Baker | 705/36 R |
| 6,912,509 | B1 | * | 6/2005 | Lear | 705/36 R |
| 7,013,291 | B1 | * | 3/2006 | Green | 705/31 |
| 7,016,870 | B1 | * | 3/2006 | Jones et al. | 705/35 |
| 7,020,629 | B1 | * | 3/2006 | Kihn | 705/36 R |
| 7,085,690 | B2 | * | 8/2006 | Sale | 703/2 |
| 7,171,385 | B1 | * | 1/2007 | Dembo et al. | 705/36 R |
| 7,228,290 | B2 | * | 6/2007 | Browne et al. | 705/36 R |
| 7,236,953 | B1 | * | 6/2007 | Cooper et al. | 705/36 R |
| 7,328,182 | B1 | * | 2/2008 | Yahil et al. | 705/36 R |
| 2002/0007329 | A1 | | 1/2002 | Alcaly et al. | 705/35 |
| 2002/0019789 | A1 | | 2/2002 | Ginsberg | 705/36 |
| 2002/0091605 | A1 | * | 7/2002 | Labe et al. | 705/36 |
| 2002/0123951 | A1 | * | 9/2002 | Olsen et al. | 705/36 |

(Continued)

FOREIGN PATENT DOCUMENTS

WO    WO 01/37168    11/2000

OTHER PUBLICATIONS

Int'l Search Report for PCT/US02/09061.

*Primary Examiner*—James P. Trammell
*Assistant Examiner*—J. Bradley Wright
(74) *Attorney, Agent, or Firm*—Isabel Cantallops; Clifford Chance US LLP

(57) ABSTRACT

A method for forming an index in which a universe of N instruments is initially defined. In a second step, a covariance matrix is assigned to the universe. In a third step, one of the instruments from the universe is removed. In a fourth step, a residual variance of the remaining universe is calculated. In a fifth step, the removed instrument is reinstated into the universe. Next, steps three through five of the method are repeated N-1 times. In a sixth step, the removed instrument for which the residual variance is minimized is inserted into the index. In a seventh step, the removed instrument for which the residual variance is minimized is eliminated from the universe. In an eighth step, variance of each instrument in the remaining instrument is recalculated by replacing it with its residual variance Finally, the third through eighth steps are repeated until the index is formed.

38 Claims, 1 Drawing Sheet

U.S. PATENT DOCUMENTS

| | | | |
|---|---|---|---|
| 2002/0123953 A1* | 9/2002 | Goldfarb et al. | 705/36 |
| 2003/0004845 A1* | 1/2003 | Takeda et al. | 705/36 |
| 2003/0046212 A1* | 3/2003 | Hunter et al. | 705/36 |
| 2004/0186803 A1* | 9/2004 | Weber et al. | 705/35 |
| 2005/0137963 A1* | 6/2005 | Ricketts et al. | 705/37 |

* cited by examiner

INDEX SELECTION METHOD

BACKGROUND

The following invention relates to a financial index and, in particular, to a method for selecting securities for inclusion in a fixed income index.

A financial index is a statistical construct that measures price changes, returns, interest rates and/or other financial data in stock markets, fixed income markets, currencies or futures markets. The purpose of forming an index is to provide a summary measure whose behavior is representative of the movements of prices or rates of a basket of securities and thus indicative of the behavior of a broad market. Because indices serve as a barometer for the overall performance of a particular market, they are used as benchmarks against which investment results are measured as well as for implementing various investment strategies such as asset allocation, relative value analysis, and portfolio analysis. Furthermore, indices are often used as a basis for other products and strategies— including derivative products—that provide investors with a convenient way of profiting from overall market movements. Examples of indices are the S&P 500, an equity index that tracks the performance of 500 publicly traded companies, and the J. P. Morgan Government Bond Index, a benchmark used for measuring performance and quantifying risk across international sovereign bond markets.

An index is typically formed by first selecting a universe of instruments whose performance the index is to track. For example, in forming a corporate bond index, the universe may be selected by including all corporate bonds having a maturity greater than one year, an outstanding debt of $150 million or greater, and a credit rating below S&P BBB-. Once the universe is identified, the index may be formed by including all the instruments in the universe on a weighted-average basis. An index formed using this technique, sometimes called a complete market index, is simple to construct. Because a complete market index contains all of the bonds in the universe, it is by definition representative of the universe of underlying instruments.

Complete market indices formed using the prior art techniques have several drawbacks. First, for broad and diverse markets, data quality may become compromised due to the sheer volume of data. Second, because these indices include all the instruments contained in the universe, it is difficult to obtain accurate, timely and contemporaneous pricing for all of the issues in the index. This is particularly important in broad and diverse markets because of the illiquidity of certain constituent instruments. Third, indices comprising large numbers of securities are difficult or impossible to replicate. This is also especially true in broad, diverse and less liquid markets. Furthermore, because a substantial portion of the underlying instruments contained in the index are not trader priced or priced with prices available in the market, it becomes more difficult or sometimes impossible to replicate the index. An index that is not replicable is not suitable for use in most investment situations including, by way of non-limiting for example, where the index is used as a hedging tool, used in the construction of an investment portfolio or used to design baskets to track the index.

To overcome the lack of accurate and timely pricing, many indices use a technique known as matrix pricing. In matrix pricing a portion of the instruments contained in the universe are priced using direct market observation of trader bids and offers or actual transactions. The prices of the remaining instruments are not based on such trader pricing but rather are estimated based on assumptions and using formulas or computer models. As an example, it may be assumed that all instruments issued by the same company or within the same sector as the instruments that have trader pricing move together. Thus, because trader pricing is not directly obtained for each instrument in the universe, matrix pricing improves the speed at which the price of an index can be updated.

Although matrix pricing improves somewhat the speed at which the price of an index can be updated, pricing an index using such techniques diminishes the accuracy of the index in representing the actual behavior of the universe.

Another drawback of prior art indices exists with respect to those designed to represent the fixed income market that typically includes multi-dimensional risks that arise from a variety of factors including bond specific factors, such as coupon, maturity, credit rating, etc., and othe factors, such as, the issuer, industry, and country/region. Because the prior art indices generally can only reflect such multi-dimensional risk by including the entire universe of instruments in the index, prior art fixed income indices are difficult to price and replicate, as described above.

Accordingly, it is desirable to provide a method for forming a fixed income index that is representative of a universe of instruments and that can be accurately priced in a timely and replicable manner.

SUMMARY OF THE INVENTION

The present invention is directed to overcoming the drawbacks of the prior art. Under the present invention a method is provided for forming an index where the index includes a subset of instruments selected from an original universe of N instruments. The method begins with selecting a universe of instruments. Next, a covariance matrix, which is composed of a variance for each instrument in the universe and a correlation matrix, is assigned to the universe. Then, one of the instruments is sampled and removed from the universe. Next, a residual variance for each of the remaining instruments in the universe is calculated and a residual variance for the universe is formed. In a next step, the removed instrument is reinstated into the universe. Next, it is determined if all instruments in the universe have been sampled. If all the instruments in the universe have not been sampled, the method returns to the step of sampling and removing an instrument from the universe. If all of the instruments in the universe have been sampled, then, in a next step, the instrument for which the residual variance of the universe is minimized is inserted into the index. Then it is determined whether a stopping criterion for the completion of the index has been met. If it has been met, then the index has been formed. If the stopping criterion has not been met, then the universe is reduced by eliminating from the universe the instrument that has just been added into the index. Then, the covariance matrix assigned to the universe is updated using the residual variance of each of the remaining instruments in the reduced universe and the original correlation matrix. The method then returns to the step in which an instrument is sampled and removed from the universe. The method continues in this manner until the stopping criterion has been met and the index is formed.

In an exemplary embodiment, some of the instruments in the universe are associated with an entity and a correlation value is assigned between each of those instruments associated with the entity. Also, some of the instruments in the universe are within a first industry or economic sector in a country, but associated with different entities, and a correlation value is assigned between each of those instruments. In addition, some of the instruments in the universe are within a second industry or economic sector and a correlation value is assigned between each of those instruments within the first sector and each of those instruments within the second sector. Finally, some of the instruments in the universe are associated with a first country and some of the instruments in the universe are associated with a second country and a correlation value is assigned between each of those instruments associated with the first country and each of those instruments associated with the second country.

In another exemplary embodiment, the correlation values between each of those instruments associated with an entity are identical, the correlation values between each of those instruments within the first sector in a country, but associated with different entities, are identical, the correlation values between each of those instruments within the first sector and each of those instruments within the second sector are identical and the correlation values between each of those instruments associated with the first country and each of those instruments associated with the second country are identical.

In yet another exemplary embodiment, an original "dv01" of the universe is calculated before the sampling process starts ("dv01" is the change in dollar value due to a one basis point change in yield). Next, the step of eliminating from the universe the removed one of the instruments for which the residual variance is minimized also includes the step of calculating the remaining dv01 of the original universe. Finally, the index is formed when the remaining dv01 is within a predetermined percentage of the original dv01.

Thus, by assigning correlation values between instruments in the universe and determining which of the instruments in the universe minimize the residual variance, an index is formed that is representative of the universe and that includes only a portion of the instruments contained in the universe. Accordingly, because an index formed using the method of the present invention contains a significantly smaller set of instruments than prior art complete market indices, the index can be accurately priced in a timely manner and will be inherently more replicable.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
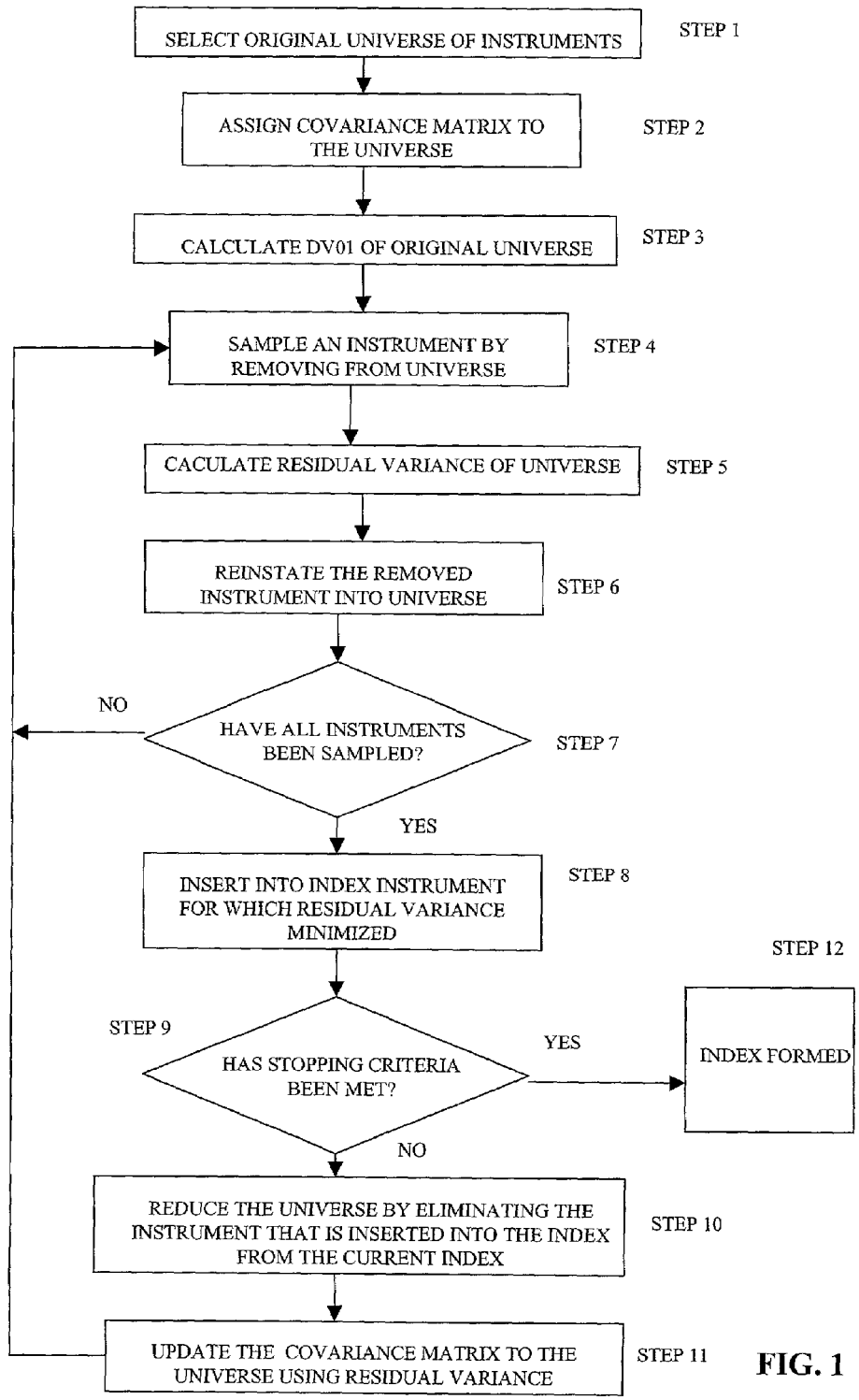
FIG. 1 is a flow chart of the method for selecting instruments for inclusion in an index according to the present invention.

Referring now to FIG. 1, there is shown a flow chart of the method for selecting instruments for inclusion in an index according to the present invention. In Step 1, a universe of instruments is selected from which the instruments to be included in the index are drawn. The universe of instruments may be constructed using any criteria such as, by way of non-limiting example, debt outstanding, market capitalization, credit rating, liquidity, sector and geography. For example, criteria that may be used to define a universe of instruments could be all non-investment grade bonds with $150 mm or more par amount outstanding and with a remaining maturity of more than one year. This example would roughly define a universe of instruments that comprise what is commonly referred to as the high yield market. By applying the method of the present invention, as is described below, a manageable number of instruments is selected from the universe for inclusion in the index in a manner so that the index is an objective, accurate and replicable representation of the economic activity of the universe.

In Step 2, a variance, which will be defined later, is assigned to each of the instruments in the universe and a correlation matrix is assigned to the universe. Correlation values between instruments in the universe indicate the possible relative movement between such instruments. For instance, if two instruments are determined to be highly correlated (for example, they have a correlation approaching 1.0), it indicates that both instruments will likely move in unison. On the other hand if the two instruments have a correlation approaching −1.0, this indicates that the instruments will likely move in opposite directions. A correlation of 0.0 indicates that the movements of the two instruments are unrelated.

In an exemplary embodiment, correlation values are assigned to the instruments in four dimensions. In the first dimension, intra-company correlation values are assigned between instruments that are issued by the same company. For example, if XYZ Corp. has seven different issued bonds that are in the universe, a correlation value is assigned to each of the bonds indicating the likelihood that such bonds will move together. Thus, the third and fifth bonds may be assigned a first correlation value while the second and sixth bonds may be assigned a second correlation value. Next, in the second dimension, intra-sector correlation values are assigned between instruments in the same sector, such as technology or semiconductors, in a particular country to reflect that instruments in the same sector in the particular country often behave similarly. In the third dimension, inter-sector correlation values are assigned between instruments in different sectors to account for any connection between two sectors such as, for example, the technology and energy sectors. Finally, in the fourth dimension, inter-country correlation values are assigned between instruments originating from different countries (or other political or geographic subdivisions) in order to reflect the relative economic activity within and between countries and regions throughout the world.

In an exemplary embodiment, the process of assigning correlation values is simplified by assigning one correlation value for each of the four dimensions. For example, with respect to the first dimension, all of the instruments associated with a particular company are assigned the same company correlation value. Similarly, in the second dimension, all instruments in a given sector in a particular country are assigned the same sector correlation value while in the third and fourth dimensions, all the instruments between a pair of sectors and between a pair of countries are assigned identical inter-sector correlation values and inter-country correlation values, respectively. Such a simplified correlation matrix is preferred because it is often difficult to obtain a correlation matrix through market data, especially in some illiquid markets, and because a correlation matrix obtained through market data can be quite unstable.

Although the above embodiment includes assigning correlation values in four dimensions, it will be obvious to one of ordinary skill in light of the description above to assign correlation values in additional dimensions to account for patterns of behavior within the universe of instruments.

In an exemplary embodiment, in Step 3, an original dv01 of the universe is calculated using techniques well known in the art. As will be explained later, this dv01 value for the universe may be used to identify at what point a suitable number of instruments are already included in the index at which point the index selection process can be terminated.

Once the universe is selected, the process of selecting instruments for inclusion in the index begins by sampling each instrument in the universe by recursively executing Steps 4-6 as described below.

In Step 4, one instrument from the universe is removed from the universe. Next, in Step 5, the residual variance of the universe, less the one instrument that was removed, is calculated.

The process of calculating the residual variance of the universe includes defining the variance of total return, R, of the universe as:

$$VAR(R) = VAR\left(\sum_i w_i \Delta \frac{P_i}{P_i}\right) = VAR\left(-\sum_i w_i d_i \Delta Y_i\right) \quad (1)$$

$$= \sum_i w_i^2 d_i^2 \sigma_{Y,i}^2 + 2\sum_i \sum_{j>i} w_i w_j d_i d_j \sigma_{Y,i} \sigma_{Y,j} \rho_{i,j}$$

where $w_i$ is the market value percent (i.e., weight) of the ith instrument, $$\frac{\Delta P_i}{P_i}$$

is the percent change in price plus accrued interest of the ith instrument, $\Delta Y_i$ is the yield change of the ith instrument, $d_i$ and $d_j$ are the modified durations of the ith and jth instruments, respectively, $\sigma_{Y,i}$ and $\sigma_{Y,j}$ are the yield volatilities of the ith and jth instruments, respectively, and $\rho_{i,j}$ is the correlation coefficient between the ith and the jth instruments.

Alternatively, equation (1) can also be written as:

$$VAR(R) = w^T C w \quad (1')$$

where $w^T$ is a vector of instrument weights, and C is the covariance matrix with $C_{i,j} = d_i d_j \sigma_i \sigma_j \rho_{i,j}$.

Thus, by defining $\sigma_i^0 = w_i d_i \sigma_{Y,i}$ as the standard deviation of the ith instrument's total return, the variance of total return of the universe can be represented by:

$$VAR(R) = \sum_i (\sigma_i^0)^2 + 2\sum_i \sum_{j>i} \sigma_i^0 \sigma_j^0 \rho_{i,j} \quad (2)$$

After m instruments, $k_1, k_2, \ldots, k_m$, $m \geq 1$, have been removed from the universe (and added to the index), the residual variance of the remaining universe is calculated by:

$$RESVAR^m(R) = \sum_{i \notin K} (\sigma_i^m)^2 + \sum_{i \notin K} \sum_{j \neq i, j \notin K} \sigma_i^m \sigma_j^m \rho_{i,j} \quad (3)$$

where $$\sigma_i^m = \sigma_i^0 \sqrt{(1-\rho_{i,k_1}^2)(1-\rho_{i,k_2}^2)\ldots(1-\rho_{i,k_m}^2)}, \quad i \notin K = \{k_1, k_2, \ldots, k_m\}. \quad (4)$$

The value of $(\sigma_i^m)^2$ is the residual variance of the ith instrument after m instruments have been removed from the original universe.

Once the residual variance of the universe is calculated, next in Step 6, the one instrument that was removed is reinstated in the universe. In Step 7 it is determined whether all of the instruments have been sampled. If all of the instruments in the universe have not been sampled, then the method repeats Steps 4-6 until all the instruments in the universe have been sampled. If all of the instruments have been sampled then the method proceeds to Step 8, in which the instrument corresponding to the smallest residual variance of the universe is inserted into the index.

Next, in Step 9, a stopping criterion is checked. In an exemplary embodiment, a remaining dv01 of the original universe is calculated and is compared to the original dv01 of that universe which was calculated before the sampling process started. If the remaining dv01 is a predetermined percentage of the original dv01, then the selection method continues to Step 12 indicating that the index has been formed. In addition to using the dv01 measure for terminating the index selection process, any other benchmark may be used including, but not limited to, a selection of a predetermined number of instruments, a percentage of instruments selected from the universe and a market capitalization amount for the index.

If, however, the stopping criteria is not met, then, in Step 10, the universe is reduced by eliminating from the universe the instrument that has just been inserted into the index. In Step 11, the variance of each remaining instrument is updated by replacing it with its residual variance in the reduced universe, as defined in formula (4). The method returns to the sequence of Steps 4-6 in which another instrument is selected for the index by determining which of the instruments in the remaining universe of instruments minimizes the residual variance of the remaining universe.

For example, when selecting the m+1th instrument for inclusion in the index, the residual variance is a function of each candidate instrument x, $x \notin K$, under consideration, and the residual variance is calculated by:

$$RESVAR^{m+1}(R \mid x) = \sum_{i \neq x, i \notin K} (\sigma_i^m)^2 (1-\rho_{i,x}^2) + \sum_{i \neq x, i \notin K} \sum_{j \neq i, j \neq x, j \notin K} \sigma_i^m \sigma_j^m \sqrt{(1-\rho_{i,x}^2)(1-\rho_{j,x}^2)} \rho_{i,j} \quad (5)$$

$$= \sum_{i \neq x, i \notin K} (\sigma_i^{m+1}(x))^2 + \sum_{i \neq x, i \notin K} \sum_{j \neq i, j \neq x, j \notin K} \sigma_i^{m+1}(x) \sigma_j^{m+1}(x) \rho_{i,j}$$

where $\sigma_i^{m+1}(x) = \sigma_i^m \sqrt{1-\rho_{i,x}^2}$. Thus, the instrument with the least RESVAR $^{m+1}$ (R) will be the m+1th instrument to be selected for inclusion in the index and $\sigma^{m+1}$ for the remaining instruments will be calculated thereafter.

The method continues in this manner until the remaining dv01 of the original universe reaches the predetermined percentage of the original dv01, or until some other termination criteria is met, at which time the method terminates and the index is completely formed.

The selection method of the present invention prefers instruments for inclusion in the index that are more highly correlated to other instruments in the universe. Both the size (e.g. market capitalization or debt size) of an individual instrument and its correlation to other instruments in the universe, will influence inclusion in the index. Furthermore, the method reduces the chances of an instrument being included in the index if the instrument is correlated to instruments that are already included in the index. According to the residual variance formula (5) above, after an instrument is placed into the index, the remaining instruments in the universe that are correlated to the instrument will have their variance, $(\sigma^{m+1})^2$, diminished while the remaining instruments that are not correlated to that instrument will not be affected. In particular, the degree of the variance reduction is proportional to the degree of correlation. This results in a diversified index and a balanced representation of the multi-dimensionality of the universe.

Accordingly, by assigning correlation values between instruments in the universe and determining the one of the instruments the removal of which minimizes the residual variance of the universe, an index is formed that is representative of the universe and that includes only a portion of the instruments contained in the universe. Thus, because an index formed using the method of the present invention can contain a significantly smaller set of instruments than prior art complete market indices, the index can be accurately priced in a timely and replicable manner. Although the description above related to forming an index of fixed income securities, it will be obvious to one of ordinary skill to apply the above for forming an index of other securities including, by way of non-limiting example, equities or FX securities.

The method of the present invention provides a unique ranking of all instruments in a given universe with respect to their contribution to multi-dimensionally defined risk. It will be obvious to one of ordinary skill to apply the methods of the present invention for the purposes of portfolio construction, risk management, capital allocation or regulation, as well as index production and derivative securities applications.

Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall there between.

The invention claimed is:

1. A computer-implemented method for forming an index, the index including a subset of instruments selected from a universe of N instruments, the method comprising the steps of:
   a) assigning a covariance matrix to the universe, said covariance matrix comprising a variance for each of the instruments and a correlation matrix;
   b) calculating an original dv01 of the universe;
   c) after calculating the original dv01 of the universe, removing one of the instruments from the universe;
   d) calculating a residual variance for each of the instruments remaining in the universe;
   e) calculating a residual variance for the universe based on the residual variance for each of the instruments and the correlation matrix;
   f) reinstating the instrument into the universe;
   g) repeating steps c-f for each instrument in the universe;
   h) inserting into the index the one of the instruments for which the residual variance of the universe is minimized and
   calculating a remaining dv01 of the universe;
   i) elimination from the universe the one of the instruments for which the residual variance of the universe is minimized; and
   j) repeating steps c-i until the index is formed,
   wherein said index is formed when the remaining dv01 of the universe is a predetermined percentage of the original dv01 of the universe,
   and wherein at least one of the steps is implemented with a computer.

2. The method of claim 1, wherein the step of assigning a covariance matrix includes the steps of:
   calculating a variance for each of the instruments in the universe; and
   assigning a correlation value between a plurality of pairs of the instruments in the universe.

3. The method of claim 2, wherein some of the instruments in the universe are associated with an entity and wherein the step of assigning a correlation value further comprises the step of:
   assigning a correlation value between each of the some of the instruments associated with the entity.

4. The method of claim 3, wherein the correlation value between each of the some of the instruments associated with the entity is identical.

5. The method of claim 2, wherein some of the instruments in the universe are within a sector in a country and wherein the step of assigning a correlation value further comprises the step of:
   assigning a correlation value between each of the some of the instruments within the sector in the country.

6. The method of claim 5, wherein the correlation value between each of the some of the instruments within the sector in the country is identical.

7. The method of claim 2, wherein some of the instruments in the universe are within a first sector and some of the instruments in the universe are within a second sector and wherein the step of assigning a correlation value further comprises the step of:
assigning a correlation value between each of the some of the instruments within the first sector and each of the some of the instruments within the second sector.

8. The method of claim 7, wherein the correlation value between each of the some of the instruments within the first sector and each of the some of the instruments within the second sector is identical.

9. The method of claim 2, wherein some of the instruments in the universe are associated with a first country and some of the instruments in the universe are associated with a second country and wherein the step of assigning a correlation value further comprises the step of:
assigning a correlation value between each of the some of the instruments associated with the first country and each of the some of the instruments associated with the second country.

10. The method of claim 9, wherein the correlation value between each of the some of the instruments associated with the first country and each of the some of the instruments associated with the second country is identical.

11. The method of claim 2, wherein some of the instruments in the universe are associated with an entity, some of the instruments in the universe are within a first sector in a first country, some of the instruments in the universe are within a second sector in a second country, some of the instruments in the universe are associated with a first country and some of the instruments in the universe are associated with a second country and wherein the step of assigning a correlation value further comprises the steps of:
assigning a correlation value between each of the some of the instruments associated with the entity;
assigning a correlation value between each of the some of the instruments within the first sector in the first country;
assigning a correlation value between each of the some of the instruments within the first sector and each of the some of the instruments within the second sector; and
assigning a correlation value between each of the some of the instruments associated with the first country and each of the some of the instruments associated with the second country.

12. The method of claim 11, wherein the correlation value between each of the some of the instruments associated with the entity is identical, the correlation value between each of the some of the instruments within the first sector is identical, the correlation value between each of the some of the instruments within the first sector and each of the some of the instruments within the second sector is identical and the correlation value between each of the some of the instruments associated with the first country and each of the some of the instruments associated with the second country is identical.

13. The method of claim 1, wherein the step of calculating a residual variance of the instruments remaining in the universe includes the step of:
calculating $$RESVAR^m(R) = \sum_{i \notin K} (\sigma_i^m)^2 + \sum_{i \notin K} \sum_{j \neq i, j \notin K} \sigma_i^m \sigma_j^m \rho_{i,j}$$

where i and j are instruments of the universe;
where $K=\{k_1, k_2, \ldots, h_m\}$ is the set of instruments that have been removed from the original universe (and added to the index);

where $\sigma_m^i = \rho_i^0 \sqrt{(1-\rho_{i,k_1}^2)(1-\rho_{i,k_2}^2)\ldots(1-\rho_{i,k_m}^2)}$, $i \notin K=\{k_1, k_2, \ldots, k_m\}$;
where $(\sigma_i^m)^2$ is the residual variance of the ith instrument after m instruments have been removed from the original universe;
where $\sigma_i^0 = w_i d_i \sigma_{y,i}$ is the standard deviation of the ith instrument's total return;
where $w_i$ is the market value percent (i.e. weight) of the ith instrument;
where $d_i$ is the modified duration of the ith instrument;
where $\sigma_{y,i}$ is the yield volatility of the ith instrument; and
where $\rho_{i,j}$ is the correlation coefficient between the ith and the ith instruments.

14. The method of claim 1, wherein the index is formed when the remaining dv01 of the universe is a predetermined percentage of the original dv01 of the universe and a predetermined number of instruments in the universe are inserted into the index.

15. The method of claim 1, wherein the index is formed when the remaining dv01 of the universe is a predetermined percentage of the original dv01 of the universe and a predetermined percentage of the instruments in the universe are inserted into the index.

16. The method of claim 15, wherein the predetermined percentage is a percentage of the universe of N instruments on a weighted basis.

17. The method of claim 1, wherein the instruments are fixed income instruments.

18. The method of claim 1, wherein the instruments are equities.

19. The method of claim 1, wherein the instruments are FX securities.

20. Computer executable program code residing on a computer-readable medium, the program code comprising instructions for causing the computer to:
form an index, the index including a subset of instruments selected from a universe of N instruments, the instructions for causing the computer to form an index comprising instructions for causing a computer to:
a) assign a covariance matrix to the universe, said covariance matrix comprising a variance for each of the instruments and a correlation matrix;
b) calculate an original dv01 of the universe before one of the instruments is removed from the universe;
c) remove one of the instruments from the universe:
d) calculate a residual variance for each of the instruments remaining in the universe;
e) calculate a residual variance for the universe based on the residual variance for each of the instruments and the correlation matrix;
f) reinstate the instrument into the universe;
g) repeat steps c-f for each instrument in the universe;
h) insert into the index the one of the instruments for which the residual variance of the universe is minimized and calculate a remaining dv01 of the universe after said one of the instruments is inserted into the index;
i) eliminate from the universe the one of the instruments for which the residual variance of the universe is minimized; and
j) Repeat steps c-i until the index is formed,
wherein the index is formed when the remaining dv01 of the universe is a predetermined percentage of the original dv01 of the universe.

21. The computer executable program of claim 20 wherein the program code additionally causes the computer to:
calculate a variance for each of the instruments in the universe; and
assign a correlation value between a plurality of pairs of the instruments in the universe.

22. The computer executable program of claim 21, wherein some of the instruments in the universe are associated with an entity and wherein the program code additionally causes the computer to:

assign a correlation value between each of the some of the instruments associated with the entity.

23. The computer executable program of claim 22, wherein the correlation value between each of the some of the instruments associated with the entity is identical.

24. The computer executable program of claim 21, wherein some of the instruments in the universe are within a sector in a country and wherein the program code additionally causes the computer to:

assign a correlation value between each of the some of the instruments within the sector in the country.

25. The computer executable program of claim 24, wherein the correlation value between each of the some of the instruments within the sector in the country is identical.

26. The computer executable program of claim 21, wherein some of the instruments in the universe are within a first sector and some of the instruments in the universe are within a second sector and wherein the program code additionally causes the computer to:

assign a correlation value between each of the some of the instruments within the first sector and each of the some of the instruments within the second sector.

27. The computer executable program of claim 26, wherein the correlation value between each of the some of the instruments within the first sector and each of the some of the instruments within the second sector is identical.

28. The computer executable program of claim 21, wherein some of the instruments in the universe are associated with a first country and some of the instruments in the universe are associated with a second country and wherein the program code additionally causes the computer to:

assign a correlation value between each of the some of the instruments associated with the first country and each of the some of the instruments associated with the second country.

29. The computer executable program of claim 28, wherein the correlation value between each of the some of the instruments associated with the first country and each of the some of the instruments associated with the second country is identical.

30. The computer executable program of claim 21, wherein some of the instruments in the universe are associated with an entity, some of the instruments in the universe are within a first sector in a first country, some of the instruments in the universe are within a second sector in a second country, some of the instruments in the universe are associated with a first country and some of the instruments in the universe are associated with a second country and wherein the program code additionally causes the computer to:

assign a correlation value between each of the some of the instruments associated with the entity;

assign a correlation value between each of the some of the instruments within the first sector in the first country;

assign a correlation value between each of the some of the instruments within the first sector and each of the some of the instruments within the second sector; and assign a correlation value between each of the some of the instruments associated with the first country and each of the some of the instruments associated with the second country.

31. The computer executable program of claim 30, wherein the correlation value between each of the some of the instruments associated with the entity is identical, the correlation value between each of the some of the instruments within the first sector is identical, the correlation value between each of the some of the instruments within the first sector and each of the some of the instruments within the second sector is identical and the correlation value between each of the some of the instruments associated with the first country and each of the some of the instruments associated with the second country is identical.

32. The computer executable program of claim 20, wherein the instructions for causing the computer to calculate a residual variance of each of the instruments remaining in the universe include:

calculating $$RESVAR^m(R) = \sum_{i \notin K} (\sigma_i^m)^2 + \sum_{i \notin K} \sum_{j \neq i, j \notin K} \sigma_i^m \sigma_j^m \rho_{i,j}$$

where i and j are instruments of the universe:

where $K=\{k_1, k_2, \ldots, k_m\}$ is the set of instruments that have been removed from the original universe (and added to the index):

where $\sigma_m^i = \sigma_i^0 \sqrt{(1-\rho_{i,j_1}^2)(1-\rho_{i,k_m}^2)}$, $i \notin K=\{k_1, k_2, \ldots, k_m\}$;

where $(\sigma_i^m)^2$ is the residual variance of the ith instrument after m instruments have been removed from the original universe;

where $\sigma_i^0 = w_i d_i \sigma_{y,i}$ is the standard deviation of the ith instrument's total return;

where $w_i$ is the market value percent (i.e. weight) of the ith instrument;

where $d_i$ is the modified duration of the ith instrument;

where $\sigma_{y,i}$ is the yield volatility of the ith instrument; and where $\rho_{i,j}$ is the correlation coefficient between the ith and the ith instruments.

33. The computer executable program of claim 20, wherein the index is formed when the remaining dv01 of the universe is a predetermined percentage of the original dv01 of the universe and a predetermined number of instruments in the universe are inserted into the index.

34. The computer executable program of claim 20, wherein the index is formed when the remaining dv01 of the universe is a predetermined percentage of the original dv01 of the universe and a predetermined percentage of the instruments in the universe are inserted into the index.

35. The computer executable program of claim 34, wherein the predetermined percentage is a percentage of the universe of N instruments on a weighted basis.

36. The computer executable program of claim 20, wherein the instruments are fixed income instruments.

37. The computer executable program of claim 20, wherein the instruments are equities.

38. The computer executable program of claim 20, wherein the instruments are FX securities.

* * * * *